(12) United States Patent
Wu et al.

(10) Patent No.: US 7,840,789 B2
(45) Date of Patent: Nov. 23, 2010

(54) DATA HIDING IN COMPILED PROGRAM BINARIES FOR SUPPLEMENTING COMPUTER FUNCTIONALITY

(75) Inventors: Min Wu, Clarksville, MD (US); Ashwin Swaminathan, Greenbelt, MD (US); Yinian Mao, Lanham, MD (US)

(73) Assignee: University of Maryland, College Park, MD (US)

( * ) Notice: Subject to any disclaimer, the term of this patent is extended or adjusted under 35 U.S.C. 154(b) by 1209 days.

(21) Appl. No.: 11/445,374

(22) Filed: Jun. 2, 2006

(65) Prior Publication Data

US 2006/0277530 A1    Dec. 7, 2006

Related U.S. Application Data

(60) Provisional application No. 60/687,486, filed on Jun. 3, 2005.

(51) Int. Cl.
| | |
|---|---|
| G06F 15/11 | (2006.01) |
| G06F 15/76 | (2006.01) |
| G06F 7/38 | (2006.01) |
| G06F 9/00 | (2006.01) |
| G06F 9/44 | (2006.01) |
| G06F 7/00 | (2006.01) |
| G06F 9/45 | (2006.01) |

(52) U.S. Cl. .................. 712/300; 712/41; 712/220; 712/226; 717/151
(58) Field of Classification Search ................ None
See application file for complete search history.

(56) References Cited

U.S. PATENT DOCUMENTS

| | | | |
|---|---|---|---|
| 5,287,407 | A | 2/1994 | Holmes |
| 5,559,884 | A | 9/1996 | Davidson et al. |
| 5,745,569 | A | 4/1998 | Moskowitz et al. |
| 6,779,101 | B1 * | 8/2004 | Berg et al. ............... 712/24 |

OTHER PUBLICATIONS

El-Khalil, R., et al., preprint of "Hydan: Hiding Information in Program Binaries", presented at ICICS'04: Sixth International Conference on Information and Communications Security, Malaga, Spain, Oct. 27-29, 2004, preprint available at www1.cs.columbia.edu/~angelos/Papers/hydan.pdf.

* cited by examiner

*Primary Examiner*—Lewis A Bullock, Jr.
*Assistant Examiner*—Mark A Gooray
(74) *Attorney, Agent, or Firm*—Rosenberg, Klein & Lee (57) ABSTRACT

Bit reductions in program instructions are achieved by determining the set of bit patterns in bit locations of the instructions. If only a subset of bit patterns is present in the instructions, they may be represented by an index value having a smaller number of bits. The index value may be substituted into the instruction and later used in decoding by referencing a corresponding bit pattern in a lookup table. The bit-reduction in the instruction makes way for supplemental data bits which may then be embedded.

18 Claims, 7 Drawing Sheets

DATA HIDING IN COMPILED PROGRAM BINARIES FOR SUPPLEMENTING COMPUTER FUNCTIONALITY

RELATED APPLICATION DATA

This Application is based on Provisional Patent Application Ser. No. 60/687,486, filed on 3 Jun. 2005.

BACKGROUND OF THE INVENTION

1. Field of the Invention

The invention described herein is directed to encoding individual computer instructions with supplemental information. More specifically, the invention locates bit patterns in processing instructions of computer program code so as to determine a compression strategy for the processing instructions that would allow at least one supplemental bit of information to be encoded therein.

2. Description of the Prior Art

Machine instructions in a compiled computer program, as specified by the Instruction Set Architecture (ISA) of a processor, are the primary means for exchanging information between a programmer and the computer hardware. ISAs are many and varied and include architectures of variable-width instructions and fixed-width instructions. An exemplary ISA implementing fixed-width instructions is the Reduced Instruction Set Computing (RISC) architecture employed by several modern processors. Although fixed-width architectures allow the processor to easily fetch, decode and execute the instructions, the encoding space of fixed-width RISC instruction sets typically cannot be expanded so as to add more information to the existing instructions, or to add more instructions to an existing ISA, although several traditional techniques have been attempted in efforts to overcome these shortcomings.

In the prior art, systems have been developed on instruction abbreviation techniques by entropy-bounded encoding the ISA of embedded Digital Signal Processors (DSPs). However, such systems involve variable size instructions, which frequently occur in DSP architecture.

Traditional software watermarking techniques have been proposed, such as those that have been used for intellectual property protection. Early software watermarking schemes re-organize basic blocks in complied code to embed a hidden mark. In more recent systems, the mark is embedded by inserting extra instructions and re-structuring existing instructions in a given program. The watermark is actually defined by the control flow of the program. Dynamic path-based software watermarking has also been attempted so as to use the run-time trace of a program and a particular program input (the secret key) to carry hidden information. An analogous approach was proposed to watermark Hardware Description Language (HDL) code for ASIC and Field Programmable Gate Array (FPGA) design. However, in most software watermarking schemes, usually after watermark embedding, the number of instructions in the program will have increased and the execution of the program will be slowed down. This cost is sometimes acceptable, however reveals limitations to applying such techniques when the goal is to improve system performance.

Various techniques for reversible data embedding and lossless compression exist, such as those used for multimedia data. Certain of these algorithms use additive spread spectrum techniques while others embed supplemental data by modifying selected features, such as the Least Significant Bit (LSB) of the host signal. These techniques cannot be directly applied to program binaries because of the inherent differences between multimedia data and program instruction data. Modification of program data by compression techniques such as the Lempel-Ziv and arithmetic coding schemes, for example, require a priori knowledge of the execution order of the instructions and are not suitable for supplementing system functionality where instruction ordering cannot be relied upon.

The present invention advantageously applies information hiding techniques to program binaries of fixed-width instruction set processors, whereby extra information is transparently embedded. The supplemental information can be extracted by the processor at very low cost in a manner that supplements computer system functionality. The invention stores and extracts the additional information in computer programs in an ISA-independent way and without inserting extra instructions. The embedded data may be used in a variety of ways, such as for value and branch prediction in pipelined instruction execution, as well as to validate the integrity and origin of a program in trusted computing environments.

SUMMARY OF THE INVENTION

In one aspect of the invention, a method is provided for supplementing program code executable by a processor with information, where the program code includes a plurality of processing instructions. A plurality of bits is removed from each of the processing instructions and an index value associated with the plurality of bits is placed in each of the processing instructions. The index value is of a bit length less in number than the plurality of bits. At least one supplementary information bit is placed in each of the processing instructions to form a plurality of supplemented processing instructions, which are stored respectively in a plurality of memory locations each having a storage width in bits equal to a length in bits of the plurality of processing instructions.

In another aspect of the invention, a method is provided for embedding information into program code that includes a plurality of processing instructions executable by a processor. The processing instructions are of a fixed length in bits and include an opcode field and an operand field. One of the opcode and the operand is selected as a selected instruction field, whereby the other of the opcode and the operand is established as a non-selected instruction field. The selected instruction field of each of the plurality of processing instructions is analyzed to identify a plurality of distinct bit patterns therein, where the plurality of distinct bit patterns are in number no greater than a predetermined threshold value. Each of the distinct bit patterns are associated with an index value having a length in bits at least one less than a number of bits in the bit patterns. One of the distinct bit patterns is removed from the selected instruction field of each of the plurality of processing instructions to form a bit-reduced instruction field. An index value corresponding to the distinct bit pattern removed is place in the bit-reduced instruction field of each of the plurality of processing instructions. Additionally, at least one supplementary information bit is placed in the bit-reduced selected instruction field to form a supplemented instruction field. A supplemented processing instruction is assembled from the supplemented instruction field and the non-selected instruction field and is stored in a memory location having a storage width in bits equal to the length in bits of the plurality of processing instructions.

In yet another aspect of the invention, a system is provided for embedding information in program code. The system includes a processor having an instruction set architecture associated therewith, where the instruction set architecture includes processing instructions of a fixed length in bits. A processing instruction analyzer determines bit patterns in a plurality of processing instructions of the program code and associates a plurality of the bit patterns respectively with a plurality of index values. A data combiner removes bits of the bit patterns from the plurality of processing instructions and places therein bits of a corresponding index value and at least one bit of supplemental data such that the processing instructions so combined are each maintained at the fixed length in bits of the processing instructions.

DETAILED DESCRIPTION OF PREFERRED EMBODIMENTS

Certain embodiments of the present invention enhance computer processing performance by adding a few bits of information to processing instructions of a compiled binary coded computer program. The accuracy of data value prediction techniques, for example, may be improved by embedding an extra bit of information into the instructions of the program that classifies instructions based on certain predictability criteria. This added information may then increase instruction-level parallelism as well as provide better utilization of prediction tables.

The present invention may also be applied to multiprocessor systems for supporting more relaxed memory consistency models. This may be achieved by classifying the load/store instructions through an extra bit of information embedded in the processor instructions. The addition of 1-2 extra bits of information to instructions associated with fixed hardware architecture improves performance while avoiding a re-design of the ISA. Altering the ISA invariably involves a major engineering effort and, more importantly, may result in binary incompatibility, i.e., making older versions of binary programs no longer compatible with the newer versions of the processor. By way of beneficial features of the invention, additional information is embedded into the instructions of a program binary without modifying the ISA and does so in a manner that provides system-wide functional enhancements.

Embedding data into program binaries is challenging due to the numerous stringent constraints imposed on the Central Processing Unit (CPU). Given the high sophistication and performance requirements of modern processor design, extra decoding logic and memory that would execute in parallel with the program execution for extracting the supplemental data has to be kept to a minimum so as to be non-invasive. It is also considered undesirable to embed supplemental data, a process alternatively referred to as "data hiding", by introducing extra instructions in the program specifically directed to carrying out that task, as such consumes execution cycles that would have been devoted to program execution.

Compared with data extraction, data embedding processes can be performed off-line and need only be performed once for any given program. Thus, although more computation and memory resources are required for data embedding, they can be used at a lesser cost when viewed in the context of program execution. Another important consideration in hiding data in program binaries is that the data hiding scheme should not interfere with the normal program execution. Thus, data embedding as applied by the invention is reversible (or lossless), meaning that both the original program, serving as the host data, and the embedded data can be recovered at the data extractor without any errors.

As indicated above, the main challenge in compressing a program binary without interfering with normal program execution arises from the fact that the order in which all of the instructions in a program are executed can be unpredictable. Due to the data dependent control flows and branches in a program, instructions are not always executed sequentially in the order in which they appear in the program binary. The instruction execution order is often determined dynamically at program execution time and some instructions might not be executed at all. For this reason, it is very difficult to employ common lossless data compression schemes such as the Lempel-Ziv and arithmetic coding, where the decoding result depends on the preceding codes. Additionally, most modern processors use some sort of speculative execution of instructions so as to execute instructions after a branch (along a predicted path) before the branch instruction completes its execution. When the branch condition is resolved and a misprediction is indicated, the processor must consequently return to the branch and from there execute the alternate instructions. Advantageously, the data embedding scheme of the present invention does not presume a certain execution order to use the previous instruction(s) to hide information for subsequent instruction(s). Moreover, to satisfy the stringent computation and memory constraints on the processor, certain embodiments of the present invention use the individual instruction as the basic data embedding unit and fixed-length compression techniques, as opposed to block coding and variable-length compression.

To exemplify the present invention, a RISC ISA, such as the IBM PowerPC ISA, will serve as a specific model ISA through which features of the present invention will be described. It is to be understood that the principles of the invention may be extended to other ISAs and that no limitations are implied by this example. The IBM PowerPC ISA is a typical RISC ISA with fixed-width instruction encoding having instructions that contain 4 bytes of information, including 6 bits for the opcode, which indicates to the processor the type of operation, and the remaining 26 bits for the operand, which indicates to the processor the parameters to use. The 26-bit operand provides a total of $2^{26}$ possible bit combinations, or bit patterns. While using 26 bits to represent these combinations defines a fixed set of possibilities for the computer hardware to process, the present invention makes use of the knowledge that it is possible to use less than 26 bits to represent a smaller set of operand possibilities, if less than $2^{26}$ combinations appear in the compiled code.

The distribution of the operand combinations in computer programs is demonstrated through examination of the SPEC CPU2000 benchmark programs. SPEC CPU2000 is a collection of representative programs widely used in computer system research. When the operands of these representative programs are analyzed, it is observed that only a very small portion of the $2^{26}$ combinations in the operand field actually appear in a program. The number of unique combinations of the operands that occur at least once in each of the SPEC programs is shown in Table 1.

TABLE 1

| Program Name | Total No. of instructions in program (N) | No. of distinct bit patterns appearing in operand field (X) | n | Memory of LUT (S bits) $S = n2^{n-1} + L$ | Relative overhead ($\eta$) Memory req./Data Hidden |
|---|---|---|---|---|---|
| SWIM | 2937 | 1800 | 9 | 2330 | 79.33% |
| ART | 5985 | 2564 | 9 | 2330 | 38.93% |
| WUPWISE | 8218 | 3807 | 9 | 2330 | 28.35% |
| EQUAKE | 9589 | 4500 | 10 | 5146 | 53.66% |
| LUCAS | 12449 | 6430 | 10 | 5146 | 41.34% |
| APPLU | 15936 | 8992 | 10 | 5146 | 32.29% |
| MCF | 18351 | 6738 | 10 | 5146 | 28.04% |
| FACEREC | 19044 | 9015 | 10 | 5146 | 27.02% |
| GZIP | 28727 | 10443 | 11 | 11290 | 39.30% |
| BZIP2 | 28632 | 9838 | 11 | 11290 | 39.43% |
| APSI | 43244 | 18538 | 12 | 24602 | 56.89% |
| AMMP | 46346 | 15682 | 12 | 24602 | 53.08% |
| GALGEL | 57971 | 19990 | 12 | 24602 | 42.44% |
| PARSER | 62807 | 15194 | 11 | 11290 | 17.98% |
| CRAFTY | 72486 | 23876 | 11 | 11290 | 15.58% |
| TWOLF | 85981 | 23876 | 12 | 24602 | 28.61% |
| EON | 121012 | 23787 | 11 | 11290 | 9.33% |
| MGRID | 151202 | 31492 | 13 | 53274 | 35.23% |
| VORTEX | 167056 | 29951 | 11 | 11290 | 6.76% |
| VPR | 182039 | 36942 | 13 | 53274 | 29.27% |
| PERLBMK | 192898 | 35929 | 12 | 24602 | 12.75% |
| MESA | 209986 | 39538 | 13 | 53274 | 25.37% |
| GAP | 220308 | 39085 | 13 | 53274 | 24.18% |
| FMA3D | 235383 | 80849 | 13 | 53274 | 22.63% |
| SIXTRACK | 360292 | 84514 | 14 | 114714 | 31.84% |
| CC1 | 571820 | 86355 | 14 | 114714 | 20.06% |

The table shows that less than one percent of the $2^{26}$ possible combinations are used in these programs. The present invention represents the operand information in fewer than 26 bits, thereby affording space for the purpose of adding data thereto.

According to aspects of the invention, X distinct combinations that appear in the operand field can be represented uniquely in $y=\lceil \log_2(X) \rceil$ bits with a one-to-one reversible mapping, where $\lceil \cdot \rceil$ returns the smallest integer no less than its argument. A table maintaining the mapping can be stored in a program header and used to establish a look-up table (LUT) in a data extractor, as described below, preferably one of a size very small compared to the number of bits gained. The (26−y) bits per instruction that are obtained by this process can be used to store supplemental information. On the data extraction side, the y-bit compressed operand is replaced by the matching 26-bit operand found in the LUT. Once the hidden data is extracted and the original instruction is recovered, the extracted supplemental information can be utilized without affecting normal program execution.

For large programs such as the CC1 (GNU C++ compiler), where X=86355, as shown in Table 1, y is computed to be 17, indicating that 26−y=9 bits per instruction may be used to store supplemental information. However, a mapping table built for these 86355 instructions would require at least X×26=2245230 bits. Clearly, this is a large overhead for gaining 9-bit supplemental information per instruction. Moreover, it is difficult to store such a large table in on-chip memory, which is a preferred configuration for fast data access. Therefore, rather than attempting to embed many bits into each instruction, certain embodiments of the invention embed only one or a few bits into each instruction using as small an LUT as possible. However, it is to be understood that embodiments that implement a large LUT certainly have application and fall within the scope of the invention.

Figure 1A:
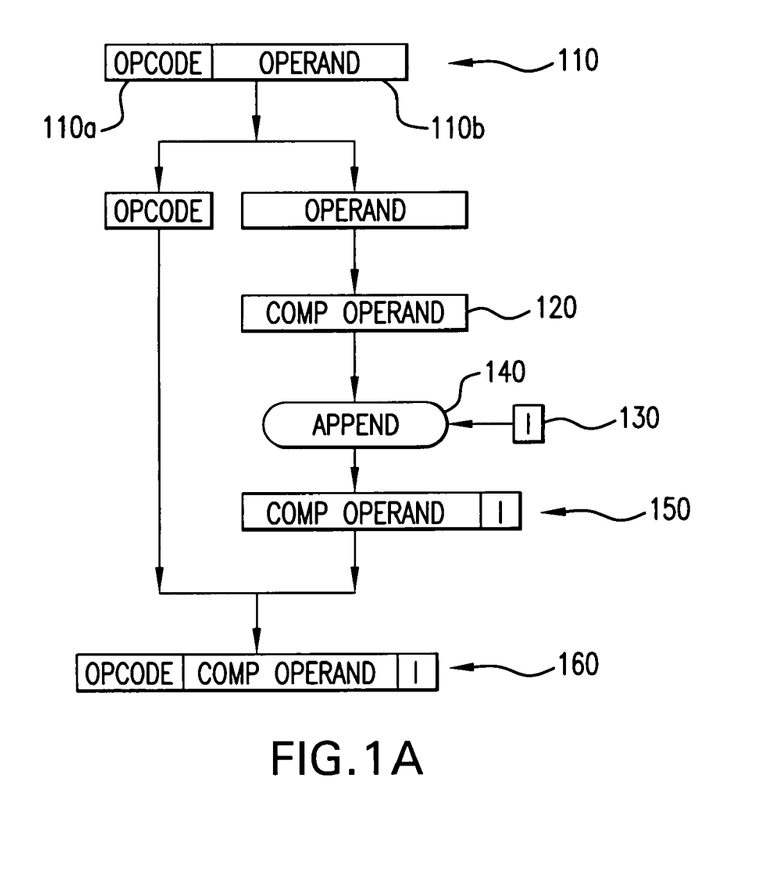
FIGS. 1A-1B are flow diagrams illustrating fundamental aspects of the present invention.
Figure 1B:
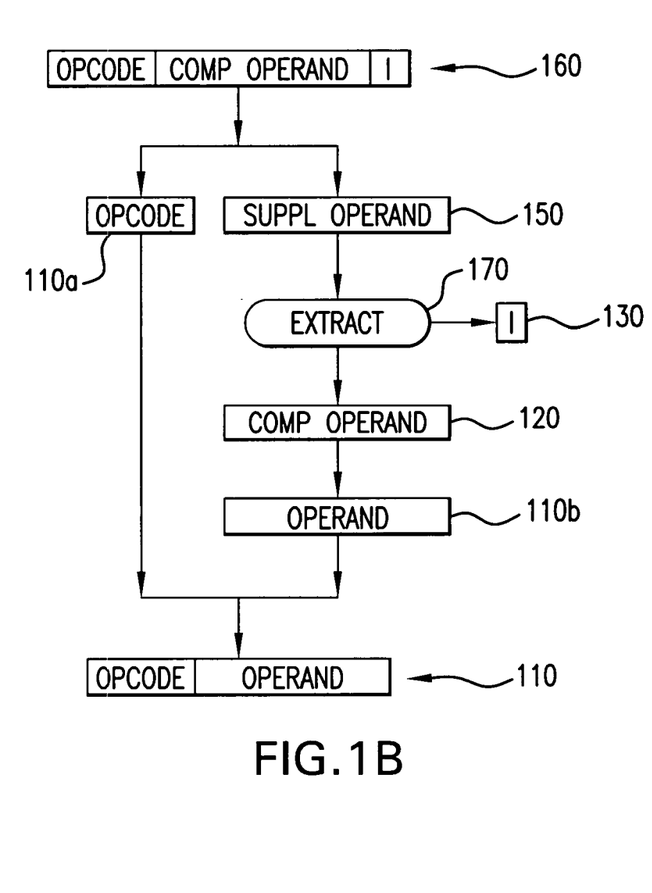

Referring to FIGS. 1A-1B, there is shown a general framework for reversible data hiding in program binaries in accordance with the present invention. As is shown in the Figures, each instruction 110 in a program binary contains a short opcode field 110a and a longer operand field 110b. It is to be understood that while the embodiments described herein will be generally directed to supplementing data to the operand field by processes to be described, the present invention is not limited thereto. The inventive measures to be described may be applied to the operand field 110b, the opcode field 110a, or any combination thereof.

Data embedding is illustrated in FIG. 1A, where it is shown that operand field 110b is compressed into a compressed operand 120. The compressed operand 120 undergoes removal of certain of its bits in accordance with criteria to be described below and the addition of bits representing the bits removed. For example, the bits corresponding to a bit pattern may be removed from the operand field 110b and fewer bits representing the bit pattern, such as an index value into the LUT mentioned above, may be placed in the operand field 110b resulting in a compressed operand 120. It is to be understood that the term "compressed" is used herein to generally refer to a bit-reduced instruction field, even when the bit locations in such field are maintained. For example, bits may be removed from an instruction and the same positions may be subsequently occupied by the index values and by supplemental data.

The compressed operand 120 undergoes an appending process 140 by which supplemental information bits 130 are appended to produce a supplemented operand 150. It is to be understood that the term "appending" as used herein refers to placing the supplemental information bits 150 into the compressed operand, even where such placement is not at the end of the compressed instruction field. Placement at the end of the compressed instruction results in simpler implementation in that the location of individual bits of the supplemental information in the compressed instruction field need not be tracked. However, more complex schemes involving multiple embedded bits throughout the instruction may be more appropriate for other applications of the invention, such as to promote security in trusted computing environments.

As is shown in the Figure, supplemented operand 150 is combined with opcode field 110a to produce a supplemented instruction 160. The supplemented instruction 160 is of the same length in bits as the original instruction 110 and may be stored in memory in the same manner as the original instruction 110 would be.

The data extraction process illustrated in FIG. 1B may be performed during program execution, as will be described. The process is essentially the reverse of that described with reference to FIG. 1A. The supplemented operand field 150 is isolated from the operand field 110a of supplemented instruction 160. The supplemental information bits 130 are extracted as indicated at 170 to reproduce the compressed operand 120. The compressed operand 120 is decompressed and the operand 10b is then recombined with the opcode 110a. The instruction 110 is then executed by the processor in the normal way. The extracted supplemental information 130 may by used by the processor pipeline or for a variety of other purposes.

Figure 2:
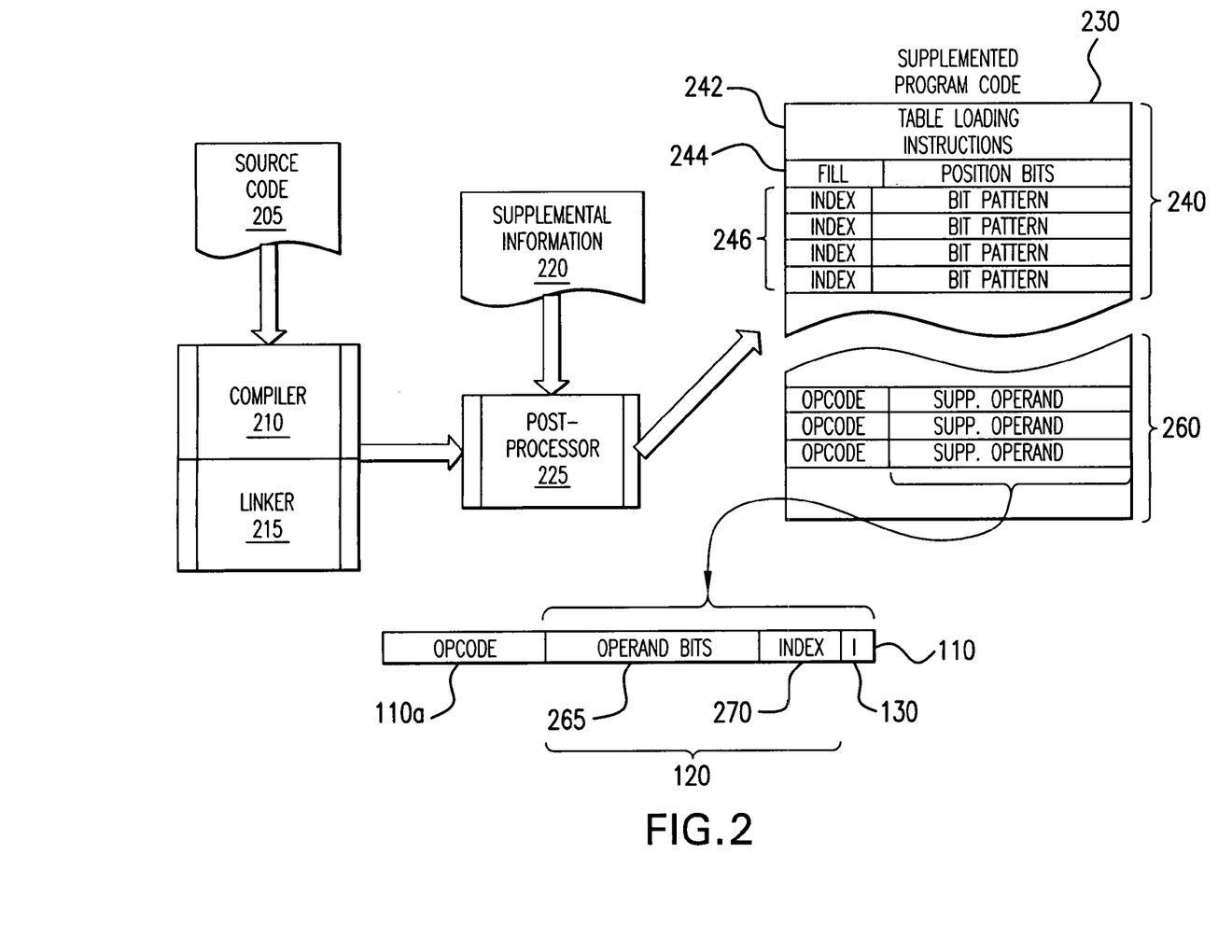
FIG. 2 is a schematic block diagram of an exemplary data embedding system consistent with the present invention.

An exemplary embodiment of an embedding system operable in accordance with the present invention is illustrated in FIG. 2, where like elements to those previously described are indicated by like reference numerals. As is shown, one or more source code files 205 are compiled by a traditional compiler 210 and are linked by a traditional linker 215. The resulting program code, which includes a plurality of program instructions of the types described above, is subjected to post-processor 225, which locates suitable patterns in the program code by processes described below and indexes them by a value represented by a fewer number of bits. The post-processor 225 appends the supplemental information 220 to the compressed operand 120, as described above, to produce a supplemented instruction 110. The supplemented instruction 110 includes the opcode field 110*a* and the supplemented operand including original, but compressed, operand bits 265, index value bits 270 representing the operand bits removed during compression, and at least one supplemental information bit 130.

The post-processor 225 builds supplemented program code 230 from the original program code provided thereto. The supplemented program code 230 includes, in certain embodiments, a program header 240 and supplemented program instructions 260. The program header 240 includes LUT information 246, position bits 244, to be described below, and instructions 242 for loading an LUT into memory for use during decoding. The table loading instructions 242, in certain embodiments, are compatible with a program loader of the operating system under which the program is to execute. The table loading instructions 242 may also form a stub program, known in the art, for loading the LUT 246 into memory and then freeing the memory it occupies once it has completed. In certain embodiments, table loading instructions 242 will include instructions for loading the LUT in consecutive memory locations in such a manner that the LUT entry is indexed by an offset from a base memory location in the consecutive memory locations. Such embodiments avoid the need for storing the index values with the LUT and the LUT size upper-bound calculations herein are made under this assumption.

Figure 3:
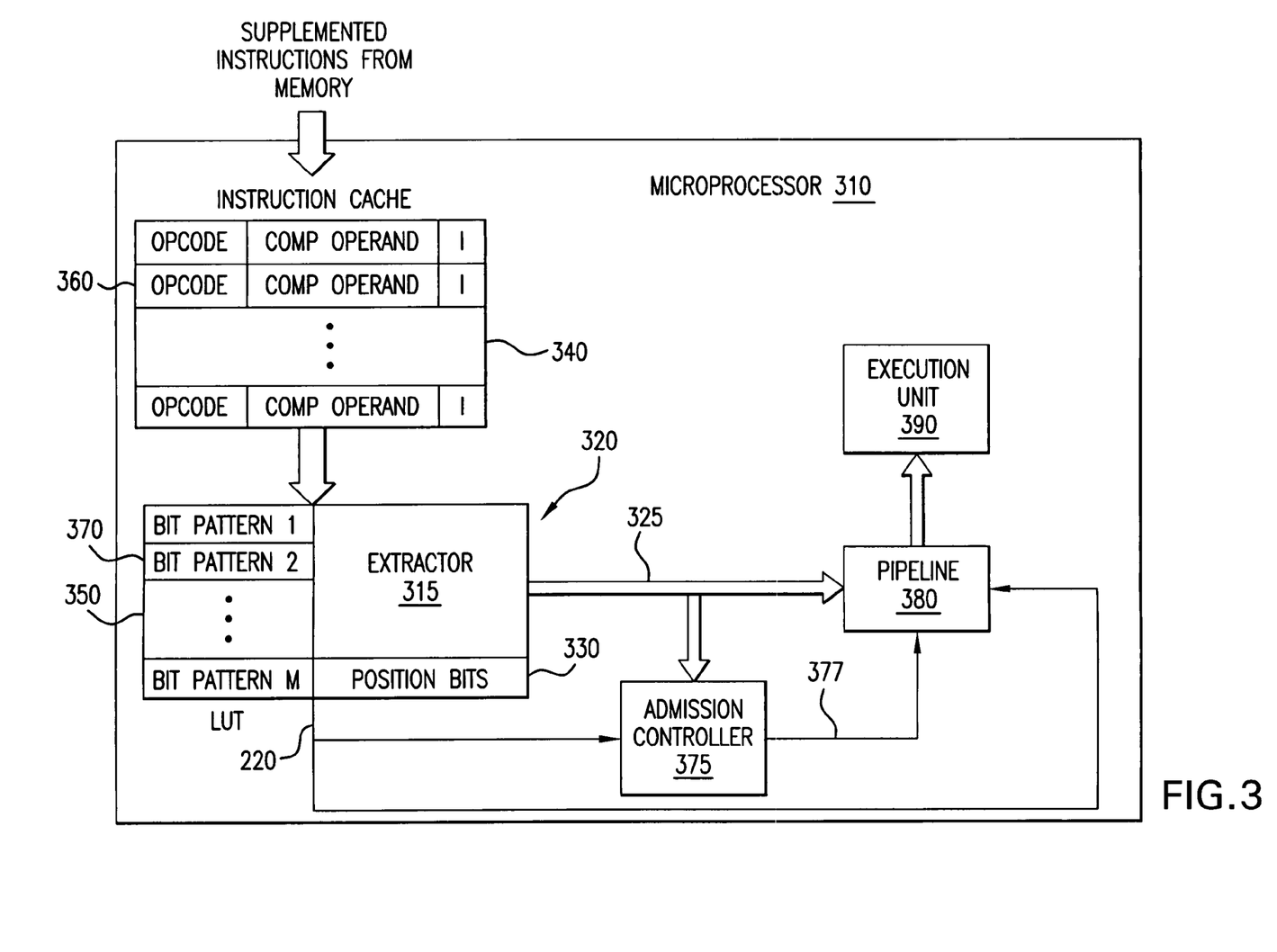
FIG. 3 is a schematic block diagram of an exemplary data extraction system consistent with the present invention.

Referring to FIG. 3, there is shown an exemplary system configuration for executing supplemented program code 230. The system includes a microprocessor 310, for executing the traditional program instructions of the ISA. The microprocessor 310 includes an instruction cache 340 having stored therein supplemented instructions 360 previously retrieved from memory. The supplemented instructions 360 are stored in the cache 340 having a width in bits equal to the bit length of the uncompressed instruction 110, thereby obviating a redesign of the cache structure.

The instruction cache 340 is coupled to a data extractor unit 320, in which is stored LUT 350 and position bits 330. An extractor 315 reforms the program instruction 110 from the supplemented instruction 360 and provides it to the processor pipeline 380 over channel 325. Extractor 315 also extracts the supplemental information 220 and provides it to the admission controller 375, which also receives the program instruction 110 over channel 325. Admission controller 375 verifies the data integrity, origin and reliability of the instruction 110 and supplemental information 220 and reports abnormal conditions to the processor 310 through the pipeline 380 over signal line 377. Such signal may be used to abort instruction thread execution or may be used to bring about a system shutdown.

If admission controller 375 verifies the instruction 110 and supplemental information 220 as being correct, both instruction 110 and supplemental information 220 are passed to the pipeline 380. The supplemental information 220 may be used by the pipeline 380 to modify or order its contents, such as through value or branch prediction, and the instructions 110 are executed accordingly by a suitable execution unit 390.

The LUT 340 is loaded into data extractor 320 in accordance with the table loading instructions 242. The compressed operands of the processing instructions 260 are in their compressed state, i.e., they have had bits removed from a location of the original operand field indicated by position bits 330, which are also loaded into the data extractor 320 in accordance with the table loading instructions 242. Each bit in the position bits 330 corresponds to a bit in the original operand 110*b* and indicates by a logical one (1) where a bit has been removed from the original operand and by a logical zero (0) where the bit is that of the original operand. The data extractor 320 then uses the position bits 330 to replace original bits prior to execution of the instruction.

Processor 310, being operable with the present invention, provides a supplemented instruction 360 to data extractor 320, which extracts the supplemental information 220 and retrieves the index value 270 from the compressed operand 120. The data extractor 320 uses the index value 270 to locate a corresponding bit pattern 370 in the LUT 350, such as by computing an offset into the LUT 350 corresponding to the index value 270, where the bit pattern 370 was identified by processes to be described below. The data extractor 320 places the bits of the bit pattern 370 in the locations indicated by the position bits 330, reassembles the instruction 110 and provides it to the pipeline 380 as described above.

Computer architecture research has suggested that even one-bit supplemental information per instruction would be very advantageous to enhance system performance. The present invention provides data that may be used to enhance the functionality of a computing apparatus without modifications to the ISA thereof. However, the invention does not limit how the supplemental information may be used. The supplemental information may be operable, for example, with a security device or process for limiting functionality of the computer to specific operations specified by the supplemental information. Moreover, a program modified by aspects of the invention is not executable without the decoding features thereof due to the modifications to the code. This beneficial feature of the invention may be used as another level of security.

Certain embodiments of the present invention provide efficient procedures to embed one bit of extra information per instruction. These techniques can be easily extended to embed more than one bit per instruction at an added cost of a larger LUT and more storage. Thus, although the embodiments that follow are described with reference to one-bit supplemental data, the invention is not limited thereto. Additionally, the embodiments described below confine the embedding to the operand field, but it is to be understood that any combination of bit positions, be they in the operand field, the opcode field or distributed over both fields, fall within the intended scope of the invention.

In accordance with aspects of the invention, embedding information into a program is carried out by searching for the smallest n so that there exists a subset of n operand bits out of L bits of the entire operand for which no more than $2^{n-1}$ distinct operand combinations have appeared in the program. In the following examples, L=26, which corresponds to the IBM PowerPC RISC ISA. The subset of n bits is losslessly represented by (n−1) bits to facilitate one bit per instruction for data hiding. This condition will be referred to herein by stating that the operand set has a "negative redundancy" of n. A lower value of negative redundancy implies more redundancy in the program, and in turn a smaller LUT for data embedding and extraction. The negative redundancy of the SPEC CPU2000 programs are given in Table 1 under the column marked "n".

For data extraction, M combinations of an n-bit pattern would require a LUT of size M×n for the inverse mapping. Additionally, up to L=26 bits would be required to specify the subset of bits involved in the mapping, such as through the position bits 330. Thus, the total cost in terms of memory usage is upper-bounded by (Mn+L) bits, provided the LUT is structured to avoid storing index values, as indicated above. As mentioned earlier, the LUT information can be stored in the program header, and will be loaded into run-time memory for use by the data extractor 320 at the outset of program execution. To reduce the overhead in program storage and in run-time memory, the LUT would be made to be as small as possible.

The size of the look-up table, the column marked "S" in Table 1, is upper bounded by (Mn+L) bits, where $M \leq 2^{n-1}$. To minimize the memory and computational overhead at the decoder 320, the smallest subset of bits for which at most $2^{n-1}$ distinct combinations appear in the program instructions must be found. This optimal value of n is denoted by $n_{opt}$ and the optimal subset that gives this mapping is denoted by $\Omega_{opt}$. Certain embodiments of the invention determine $n_{opt}$ and $\Omega_{opt}$ by exhaustively searching over every possible subset. The worst case complexity of the search over a 26-bit operand is $$\binom{26}{1} + \binom{26}{2} + \ldots + \binom{26}{26} = 2^{26} - 1$$

possibilities, which are sought for in the embedding process, where the notation $$\binom{L}{n} = L!/[n!(L-n)!].$$

Figure 4:
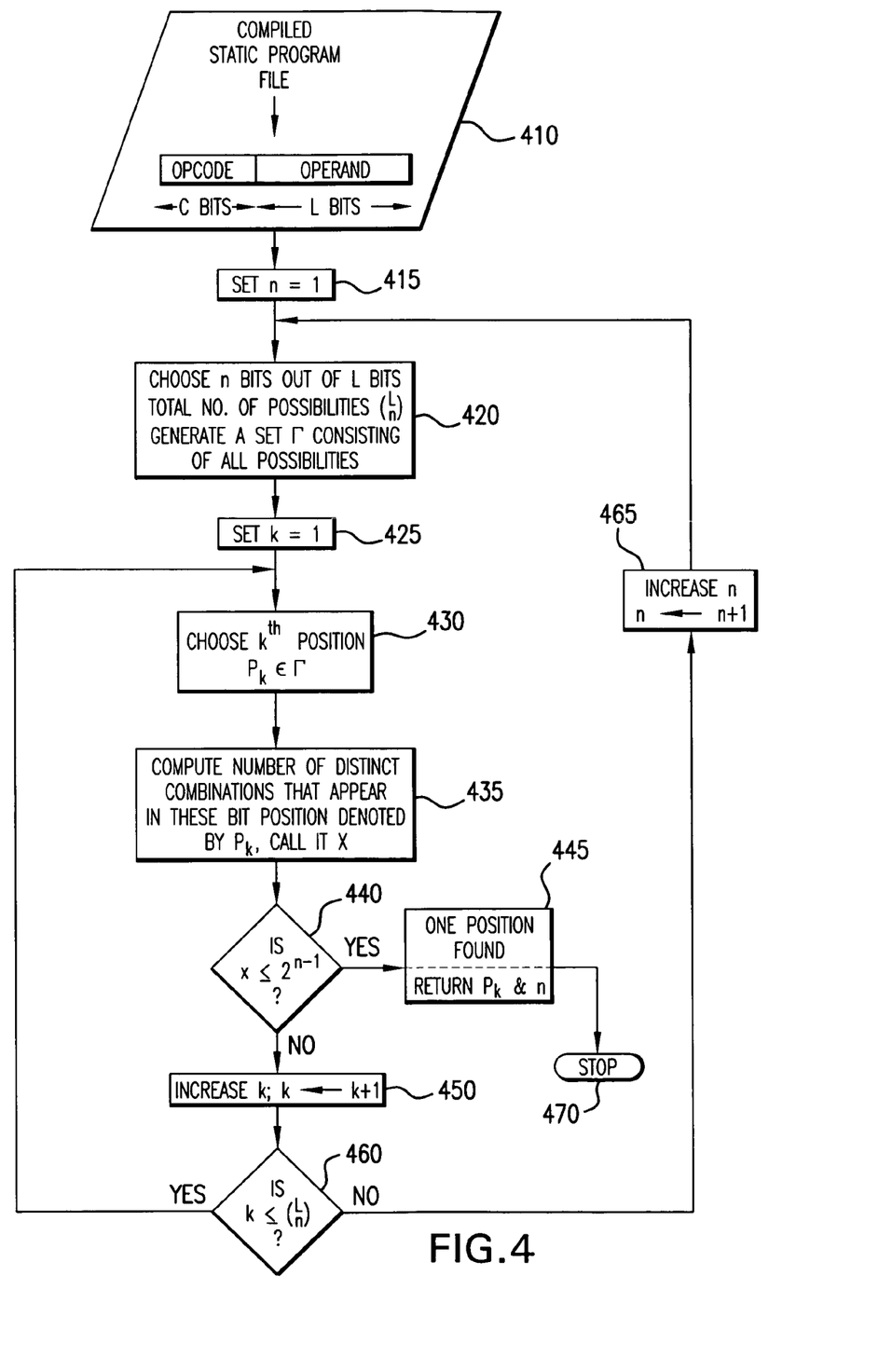
FIG. 4 is a flow diagram of an exemplary exhaustive search procedure of the present invention.
Figure 7:
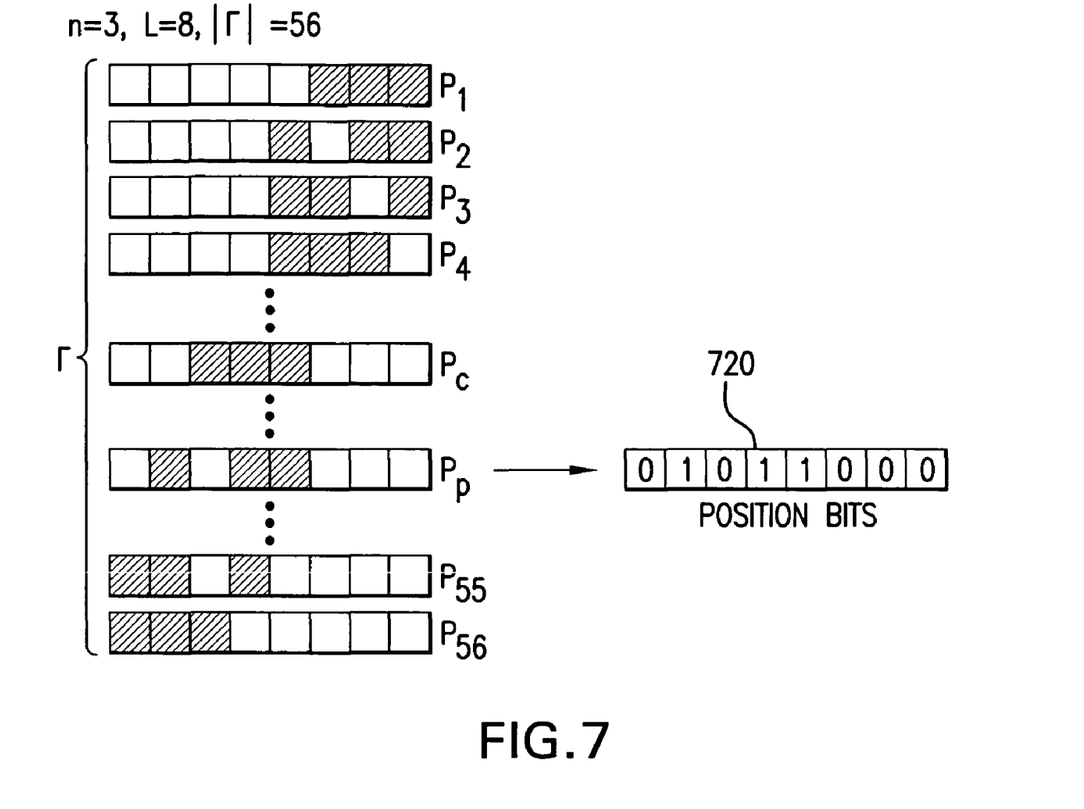
FIG. 7 is a block diagram illustrating pattern identification principles consistent with the present invention.

The "Exhaustive Search" procedure is illustrated in the flow chart of FIG. 4. The input to the process is a compiled static binary computer program as indicated at 410. The negative redundancy value n is initialized to 1, as shown at 415. Flow is transferred to block 420, where a set Γ is initialized to all $$\binom{L}{n}$$

possible bit patterns of n bits. An index k is initialized to 1 and the $k^{th}$ position $P_k$ in Γ is chosen. Such selection is referred to herein as selecting the $k^{th}$ position $P_k$ of Γ. The number X of distinct patterns corresponding to the pattern of $P_k$ that appears in the program binary is determined at block 435. This determination is illustrated further in FIG. 7 for the case of n=3 and L=8. As is shown, Γ is initialized to all possible bit locations of three bits out of eight bits. The first position is $P_1$ and all the bit combinations at the shaded bit locations are searched in all instructions in the program. The number of distinct bit combinations at those locations is assigned to the value X.

At block 440 of FIG. 4, the value of X is compared to a threshold value to determine if there is redundancy for that position $P_k = P_1$. If not, the value of k is increased at block 450 and if all $P_k$s have been evaluated for the current value of n, as determined at block 460, n is increased at block 465 and the process is transferred to block 420. If there are more positions to evaluate, flow is transferred to block 430, where the next position is evaluated, which, in the example of FIG. 7, is position $P_2$.

Figure 8:
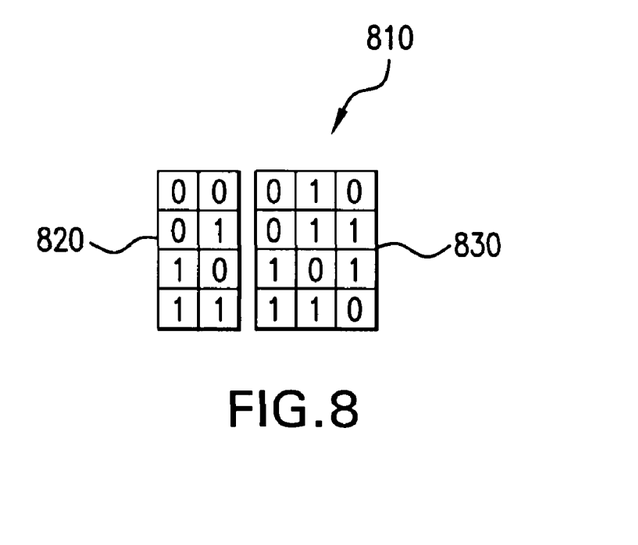
FIG. 8 is a block diagram illustrating bit reduction through index values representing bit patterns consistent with the present invention.

The process of FIG. 4 is iterated until, for a given n, a position $P_k$ is found where the number of bit patterns X in the program instructions at the position indicated is less than the threshold evaluated at block 440. For purposes of demonstration, assume the position $P_p$ of FIG. 7 meets such condition. Given the exemplary threshold condition $X \leq 2^{n-1}$, the position $P_p$ would correspond to bit locations of all instructions in the program whose combinations of states at those positions may be represented by one less bit than what the patterns occupy. This is best illustrated by the table 810 as illustrated in FIG. 8. All of the bit combinations of the position $P_p$ are given in the table 810 at 830. These are the only combinations of bit states appearing at the locations of $P_p$ and can thus be represented by the two-bit index values 820 for a bit savings of one bit over the space originally occupied in the instructions by those patterns 830 themselves. The extra bit may then be used for a supplemental information bit, as described above. Once such a position is found by the process of FIG. 4, such as is shown at block 445, the values of n and $P_k$ are returned. The value of $P_k$ may be returned as a position bit field, such as that indicated at 720 of FIG. 7.

The exhaustive search algorithm of the present invention was applied to the standard SPEC CPU2000 benchmark program suite, the results of which are summarized in Table 1. The number of instructions N in the program (excluding all the relocatable instructions that will be modified by the operating system loader); the number of unique combinations X of the bit positions, out of the possible $2^{26}$; the negative redundancy of the operand bits n; the memory required to store the inverse mapping table S; and the ratio η of S to the amount of data hidden D, where D is equal to the number of instructions with one hidden bit per instruction. It is to be observed that the negative redundancy n is usually large, in the range of 9 to 15, and therefore the size of the LUT, S, is not small. Moreover, the ratio η is above 20% in most cases, which indicates a relatively high overhead for the data hiding payload. Thus, while the exhaustive search method is accurate, its high computational complexity in finding the bit positions and low efficiency in data hiding may limit its applicability to only certain applications.

Certain embodiments of the present invention address the shortcomings of the exhaustive search method through a "consecutive search" procedure. The negative redundancy n can be greatly reduced if embedding is performed in only a subset of instructions (e.g. load/store instructions) that appear frequently in static programs.

To increase the speed of the search for the bit positions, a modified approach determines a sub-optimal value of n by considering only consecutive bit positions in the search. The number of iterations required to find a mapping reduces from $$\binom{L}{n}$$

to (L−n)+1 for a particular n. This sub-optimal value of n is denoted by n $$n_{sopt}^{(c)}$$

to reflect the positions being consecutive. While $$n_{sopt}^{(c)} \geq n_{opt},$$

it has been found that the suboptimal solution is close to the optimal solution in most cases.

Figure 5:
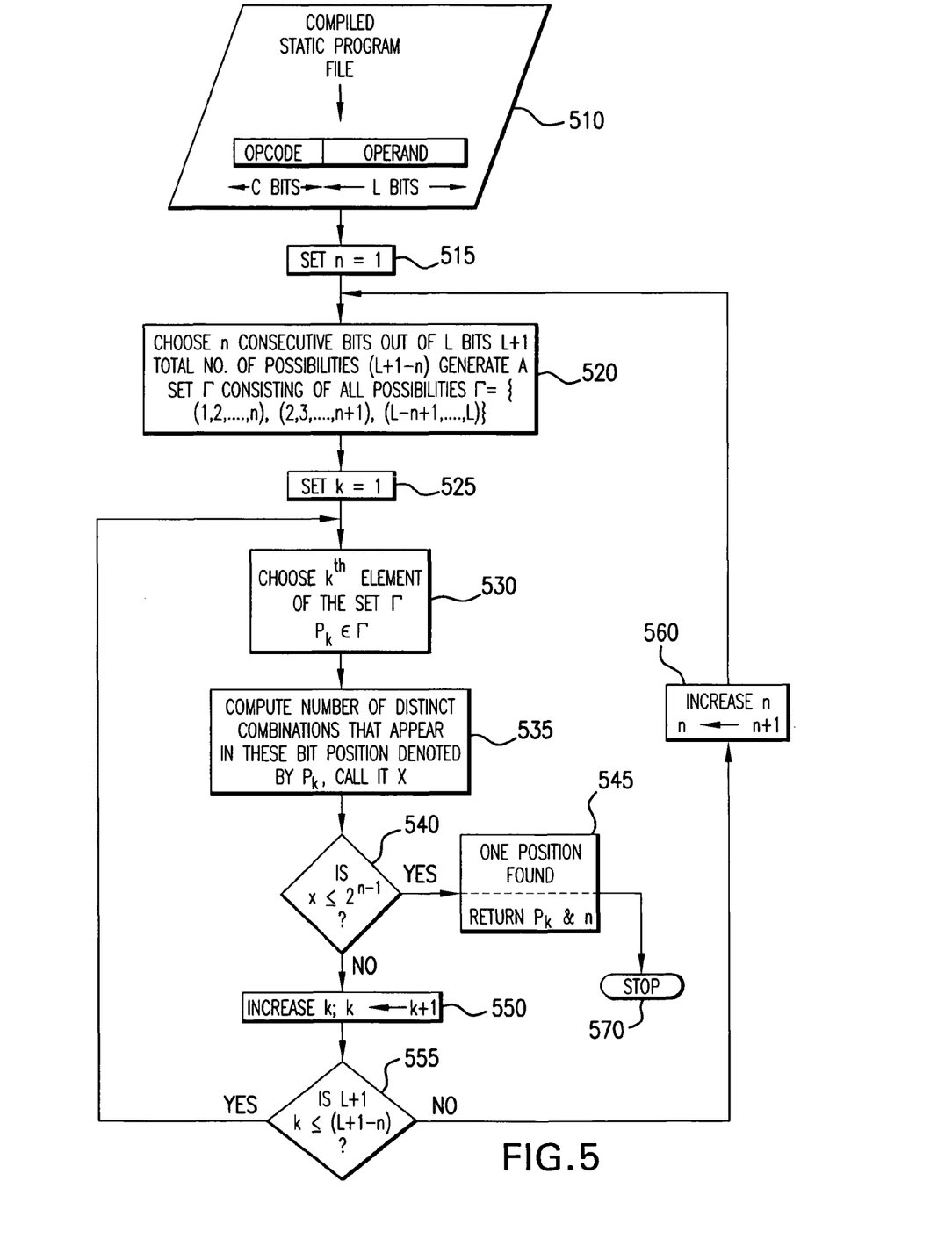
FIG. 5 is a flow diagram of an exemplary consecutive search procedure of the present invention.

The consecutive search procedure is illustrated in FIG. 5. The program binary is provided at block 510 and the value of n is initialized to one at block 515. The search field Γ is once again initialized to all possible bit locations at block 520, but now the bits are adjacent one to another. Positions $P_k$ having adjacent or consecutive bit locations are illustrated in FIG. 7 at positions $P_1$, $P_4$, $P_c$ and $P_{56}$. The search proceeds in blocks 525-570 in similar fashion to the exhaustive search method, except that in each iteration, only consecutive bit locations are considered. This defines a sliding search window that advances in location with the index k and increases in size with the value of n.

The consecutive search method was demonstrated on the SPEC CPU2000 benchmark suite with only the Load/Store instructions selected for data hiding. These instructions were chosen in that memory access instructions are often the performance bottleneck in program execution. The results for the exhaustive and consecutive search are summarized in Table 2.

It is to be noted that in most programs, about one-third of the instructions are load/store instructions, which provides a substantial amount of space for hiding data. From Table 2 it is observed that $n_{opt}$ is usually around 5-9, while $n_{sopt}^{(c)}$ is greater than $n_{opt}$ by 1 or 2 bits. Furthermore, the computation complexity is greatly reduced when consecutive search is employed. Restricting the data hiding target to only load/store instructions results in a ratio η=S/D of only around 5%, which indicates that more data can be embedded for a fixed amount of memory usage.

Referring now to Table 3, it is shown that the exhaustive and consecutive search methods often produce bit position subsets that have a large overlap. This illustrates an aspect of the invention referred to as the "iterative search" method, which first executes the consecutive search algorithm to find an initial guess for the solution with a negative redundancy of $$n_{sopt}^{(c)},$$

and then proceed outside the consecutive bits to find the optimal solution using an iterative method.

| Program Name | Exhaustive Search | | Consecutive Search | |
|---|---|---|---|---|
| | $n_{opt}$ | operand bits selected | $n_{sopt}^{(c)}$ | operand bits selected |
| MCF | 5 | (1, 2, 11, 12, 13) | 7 | (10, 11, 12, 13, 14, 15, 16) |
| PARSER | 5 | (2, 3, 11, 12, 13) | 8 | (6, 7, 8, 9, 10, 11, 12, 13) |

TABLE 2

| Program Name | Total No. of instruct. in prog. (N) | No. of embed. Load/Store instr. ($N_{ls}$) | No. of dist. bit patterns in L/S operands ($X_{ls}$) | $n_{opt}$ | $n_{sopt}^{(c)}$ | LUT size (bits) | overhead (sub-opt) | overhead (opt) |
|---|---|---|---|---|---|---|---|---|
| SWIM | 2937 | 854 | 515 | 4 | 5 | 58 | 12.41% | 6.79% |
| ART | 5985 | 1611 | 544 | 5 | 6 | 106 | 13.53% | 6.57% |
| WUPWISE | 8218 | 2682 | 1255 | 5 | 5 | 106 | 3.95% | 3.95% |
| EQUAKE | 9589 | 3581 | 1526 | 5 | 6 | 106 | 6.09% | 2.96% |
| LUCAS | 12449 | 3755 | 2059 | 5 | 5 | 106 | 2.82% | 2.82% |
| APPLU | 15936 | 5846 | 3563 | 7 | 7 | 474 | 8.11% | 8.11% |
| MCF | 18351 | 5272 | 1976 | 5 | 7 | 106 | 8.99% | 2.01% |
| FACEREC | 19044 | 6215 | 3506 | 4 | 5 | 58 | 1.71% | 0.93% |
| GZIP | 28727 | 7546 | 2627 | 5 | 8 | 106 | 13.91% | 1.40% |
| BZIP2 | 28632 | 7604 | 2163 | 6 | 8 | 218 | 13.80% | 2.87% |
| APSI | 43244 | 16380 | 6429 | 7 | 7 | 474 | 2.89% | 2.89% |
| AMMP | 46346 | 15338 | 4830 | 6 | 8 | 474 | 6.84% | 3.09% |
| GALGEL | 57971 | 20062 | 7405 | 8 | 8 | 1050 | 5.23% | 5.23% |
| PARSER | 62807 | 17182 | 3482 | 5 | 8 | 106 | 6.11% | 0.61% |
| CRAFTY | 72486 | 18213 | 5710 | 5 | 8 | 106 | 5.76% | 0.58% |
| TWOLF | 85981 | 26965 | 6204 | 6 | 8 | 218 | 3.89% | 0.81% |
| EON | 121012 | 43185 | 7646 | 7 | 8 | 474 | 2.43% | 1.09% |
| MGRID | 151202 | 39662 | 7299 | 9 | 10 | 2330 | 12.98% | 5.87% |
| VORTEX | 167056 | 43696 | 5346 | 5 | 8 | 106 | 2.40% | 0.24% |
| VPR | 182039 | 42880 | 7238 | 9 | 10 | 2330 | 12.00% | 5.43% |
| PERLBMK | 192898 | 57535 | 5733 | 7 | 8 | 474 | 1.82% | 0.82% |
| MESA | 209986 | 67305 | 14037 | 9 | 9 | 2330 | 3.46% | 3.46% |
| GAP | 220308 | 58038 | 6855 | 7 | 9 | 474 | 4.01% | 0.81% |
| FMA3D | 235383 | 98215 | 41437 | 8 | 8 | 1050 | 1.07% | 1.07% |
| SIXTRACK | 360292 | 101848 | 26804 | 11 | 11 | 11290 | 11.08% | 11.08% |
| CC1 | 571820 | 138792 | 13373 | 9 | 10 | 2330 | 3.70% | 1.67% |

-continued

| | Exhaustive Search | | Consecutive Search | |
|---|---|---|---|---|
| Program Name | $n_{opt}$ | operand bits selected | $n_{sopt}^{(c)}$ | operand bits selected |
| TWOLF | 6 | (1, 2, 3, 11, 12, 13) | 8 | (6, 7, 8, 9, 10, 11, 12, 13) |
| EON | 7 | (2, 3, 7, 8, 11, 12, 13) | 8 | (7, 8, 9, 10, 11, 12, 13, 14) |
| VORTEX | 5 | (1, 2, 11, 12, 13) | 8 | (7, 8, 9, 10, 11, 12, 13, 14) |

In the iterative search method, a solution is given in the i-th iteration that has a negative redundancy of r and a set of bit positions is $P_i$. In the (i+1)-th iteration, the solution $P_i$ is used to find a solution of negative redundancy r−1 through a systematic search. In this search, a new set of bit positions is formed by choosing (j=r−1, r−2, . . . , 1, 0) positions out of the solution $P_i$ and remaining (r−1−j) positions from the set $\{1, 2, \ldots, L\} - P_i$. Overall, this process resembles the acquisition of a final optimal solution, obtained using exhaustive search, by starting with the sub-optimal solution, obtained using the consecutive search. A set of bit positions is evaluated to determine if it reduces the negative redundancy from r−1. The iteration is started from j=r−1 and proceeds to lower values of j. If a mapping of negative redundancy (r−1) is located, $P_{i+1}$ is updated to the set of new bit positions and the process continues to the next iteration. Otherwise, it is concluded that there is no mapping with a negative redundancy less than r and the previously obtained solution $P_i$ is declared to be the optimal solution.

Figure 6:
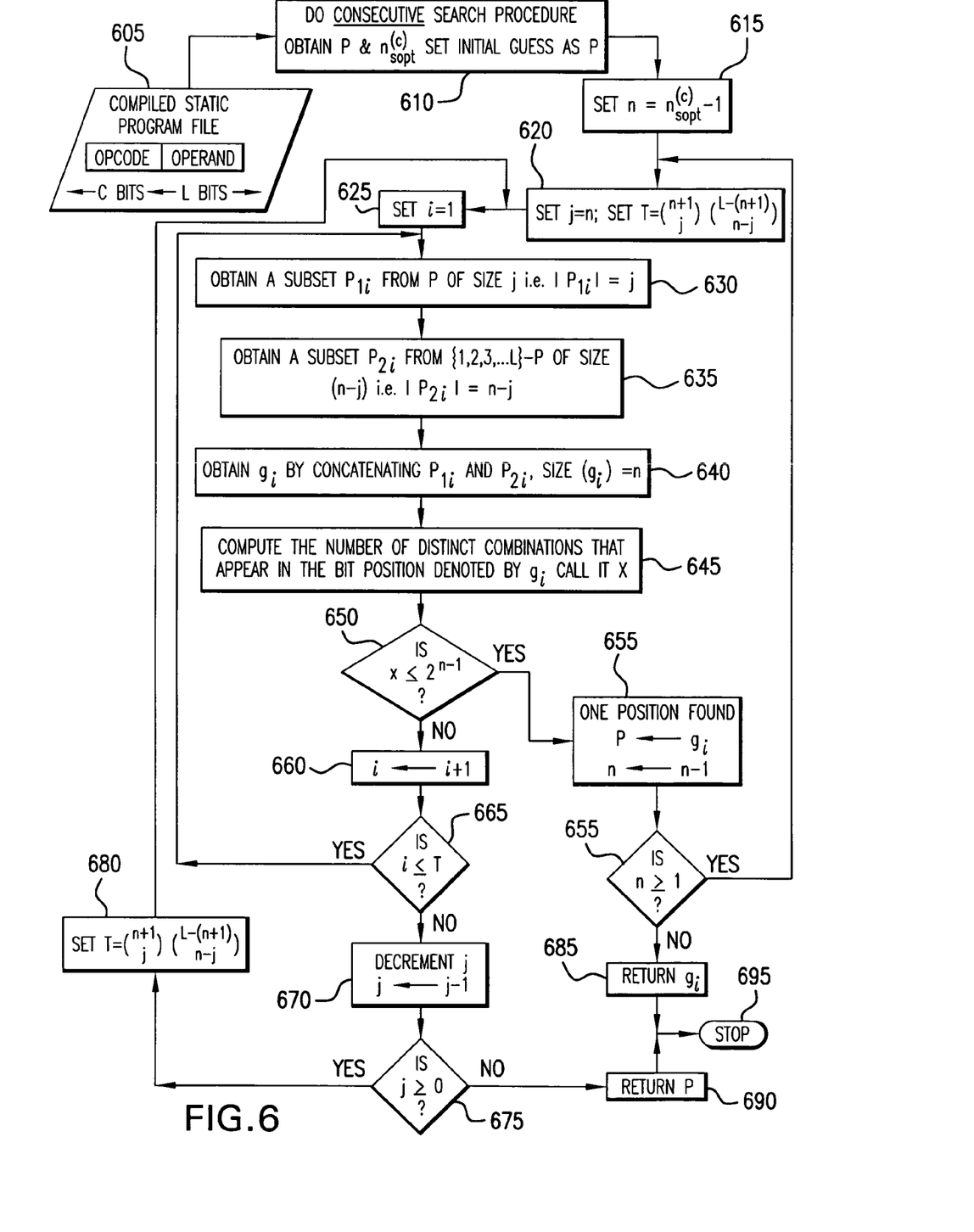
FIG. 6 is a flow diagram of an exemplary iterative search procedure of the present invention.

The iterative search method is illustrated in FIG. 6. The program is provided at block 605 and the process obtains the consecutive search results P and $$n_{sopt}^{(c)}$$

at block 610. The result serves as an initial guess for the solution. Flow is transferred to block 615, where the value of n is initialized to $$n_{sopt}^{(c)} - 1.$$

At block 620, the index j is set to n and the value T is set to $$\binom{n+1}{j}\binom{L-(n+1)}{n-j},$$

which is the number of combinations possible of j consecutive bits and n−j non-consecutive bits. At block 625, the index i is set to one. In block 630, a group of size j of bit locations are selected from the consecutive bits and in block 635, patterns of length n−j are selected from outside the consecutive bits. The total search bit field is established as the concatenation of these two bit fields in block 640 and is denoted by $g_i$. The number of distinct patterns in the program instructions at the bit positions $g_i$ is determined in block 645, where that number is denoted by X. X is compared to a threshold value in block 650 and if the threshold condition is met, the position is stored at block 655 and the process continues at block 620 with a smaller value of n. If n has been reduced to zero, then the value of $g_i$ is returned at block 685 as the solution. If at block 650, it is determined that the threshold condition is not met, then the index i is incremented at block 660 and compared with T at block 665 to determine if all bit combinations for n and j have been attempted. If not, j is decremented at block 670 and if it is still greater than zero, as determined at block 675, T is recomputed at block 680 and the process is reiterated at block 625. If j is at zero at block 675, then P is returned as the solution at block 690. The process is terminated at block 695.

It is to be noted that the iterative search algorithm in the worst case corresponds to the exhaustive search algorithm and in the best case would correspond to the consecutive search algorithm in terms of computational requirements. By this ordered search, the optimal solution $n_{opt}$ can be obtained in fewer iterations than by the exhaustive search procedure previously described.

Certain embodiments of the invention reduce the storage overhead of the basic data hiding process by introducing program partitioning. The main program is divided into several parts and a mapping table is found for each part. Each table would have smaller size than without the partitioning and can be stored together in the program header and loaded to into memory sequentially during program execution. The storage overhead in the static program is the total size of all LUTs, but the run-time memory overhead is determined only by the size of the largest LUT.

The descriptions above are intended to illustrate possible implementations of the present invention and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, by with reference to the appended claims, along with their full range of equivalents.

What is claimed is:

1. A method for supplementing with information program code executable by a processor, the program code including a plurality of processing instructions, the method comprising the steps of:

searching the program code to identify a plurality of distinct bit patterns in a plurality of processing instructions thereof;

associating a plurality of index values respectively with said plurality of distinct bit patterns;

establishing as said plurality of bits removed from each of said processing instructions a corresponding one of said distinct bit patterns;

establishing as said index value placed in said processing instructions one of said plurality of index values associated with said one of said distinct bit patterns;

removing said plurality of bits from each of said processing instructions;

placing in each of said processing instructions bits of an index value associated with said plurality of bits removed therefrom, said index value being of a bit length less in number than said plurality of bits;

placing in each of said processing instructions at least one supplementary information bit to form a plurality of supplemented processing instructions; and storing said supplemented processing instructions respectively in a plurality of memory locations each having a storage width in bits equal to a length in bits of said plurality of processing instructions.

2. The method for supplementing program code as recited in claim 1 further including the steps of:

forming a lookup table in a plurality of memory locations accessible to the processor, said lookup table having an entry corresponding to each of said plurality of index values; and entering each of said distinct bit patterns in said lookup table at a location therein referenced by said associated index value.

3. The method for supplementing program code as recited in claim 2 further including the step of providing a header to the program code, said header including processing instructions for loading said lookup table into said plurality of memory locations formed therefor.

4. The method for supplementing program code as recited in claim 3 further including the steps of:

forming a position information bit pattern indicative of bit locations in said processing instructions of bits corresponding to said bit patterns; and storing said position information bit pattern in said header.

5. The method for supplementing program code as recited in claim 1, where said bits removing step includes the step of removing said plurality of bits from one of an opcode field and an operand field of the processing instructions.

6. The method for supplementing program code as recited in claim 1 further including the step of compressing remaining bits in said processing instructions subsequent to said bits removing step, said bits of said index value and said supplemental information bit being appended thereto.

7. The method for supplementing program code as recited in claim 1 further including the steps of:

extracting said at least one supplemental information bit from each of said supplemented processing instructions;

replacing said bits of said index value with said plurality of bits associated therewith to form said plurality of processing instructions; and executing said plurality of processing instructions on the processor as the program code.

8. A method for embedding information into program code including a plurality of processing instructions executable by a processor, the processing instruction being of a fixed length in bits and including an opcode field and an operand field, the method comprising the steps of:

selecting one of the opcode and the operand as a selected instruction field, whereby the other of the opcode and the operand is established as a non-selected instruction field;

analyzing said selected instruction field of each of the plurality of processing instructions to identify a plurality of distinct bit patterns therein, said plurality of distinct bit patterns being in number no greater than a predetermined threshold value;

associating each of said distinct bit patterns with an index value having a length in bits at least one less than a number of bits in said bit patterns;

removing a corresponding one of said distinct bit patterns from said selected instruction field of each of the plurality of processing instructions to form a bit-reduced instruction field;

placing in said bit-reduced instruction field of each of the plurality of processing instructions said index value corresponding to said one of said distinct bit patterns removed therefrom;

placing in said bit-reduced selected instruction field at least one supplementary information bit to form a supplemented instruction field;

assembling a supplemented processing instruction from said supplemented instruction field and said non-selected instruction field; and storing said supplemented processing instruction in a memory location having a storage width in bits equal to the length in bits of the plurality of processing instructions.

9. The method for embedding information into program code as recited in claim 8, where said selected instruction field analyzing step includes the step of establishing as said predetermined threshold value a number equal to half a base two exponential of said number of bits in said bit patterns.

10. The method for embedding information into program code as recited in claim 8, where said selected instruction field analyzing step includes the steps of:

selecting a number of search bits;

analyzing said selected instruction field of each of the plurality of processing instructions to identify a plurality of test bit patterns having a number of bits equal to said number of search bits; and increasing said number of search bits until said number of test bit patterns is no greater than said predetermined threshold value, whereupon said plurality of test bit patterns is established as said plurality of distinct bit patterns.

11. The method for embedding information into program code as recited in claim 8, where said selected instruction field analyzing step includes the steps of:

selecting a number of adjacent search bits;

analyzing said selected instruction field of each of the plurality of processing instructions to identify a plurality of test bit patterns having a bit length equal to said number of adjacent search bits; and increasing said number of adjacent search bits until said number of test bit patterns is no greater than said predetermined threshold value, whereupon said plurality of test bit patterns is established as said plurality of distinct bit patterns.

12. The method for embedding information into program code as recited in claim 10, where said selected instruction field analyzing step includes the step of analyzing said selected instruction field of only processing instructions of a predetermined type.

13. The method for embedding information into program code as recited in claim 8, where said selected instruction field analyzing step includes the steps of:

selecting a number of adjacent search bits;

analyzing said selected instruction field of each of the plurality of processing instructions to identify a plurality of first bit patterns having a bit length equal to said number of adjacent search bits;

increasing said number of adjacent search bits until said number of first bit patterns is no greater than said predetermined threshold value, whereupon said adjacent search bits define a test bit field in said selected instruction field of each of said processing instructions;

reducing said number of bits in said test bit field by at least one bit;

analyzing said selected instruction field of each of said plurality of processing instructions to identify each of said distinct bit patterns as a combination of a bit pattern in said bit-reduced test bit field and a bit pattern in said selected instruction field outside said bit-reduced test bit field equal having a number of bits equal to a number of bits by which said test bit field was reduced.

14. The method for embedding information into program code as recited in claim 8 further including the steps of:
forming a lookup table in a memory coupled to the processor having an entry corresponding to each of said distinct bit patterns; and
entering each of said distinct bit patterns in said lookup table at a location therein referenced by said associated index value.

15. The method for embedding information into program code as recited in claim 14 further including the step of providing a header to the program code, said header including processing instructions for loading said lookup table into said memory.

16. The method for embedding information into program code as recited in claim 15 further including the steps of:
forming a position information bit pattern indicative of bit locations in said processing instructions of bits corresponding to said bit patterns; and
storing said position information bit pattern in said header.

17. A system for embedding information in program code comprising:
a processor having an instruction set architecture associated therewith, said instruction set architecture including processing instructions of a fixed length in bits;
said processing instructions including an opcode field and an operand field;
a processing instruction analyzer for determining bit patterns in a plurality of processing instructions of the program code and associating a plurality of said bit patterns respectively with a plurality of index values; and
said processing instruction analyzer determines bit patterns only in one of said operand field and said opcode field;
a data combiner for removing bits of said bit patterns from said plurality of processing instructions and placing therein bits of a corresponding index value with an index value having a length in bits at least one less than a number of bits in said bit patterns and at least one bit of supplemental data such that said processing instructions so combined are each maintained at said fixed length in bits;
storing said supplemented processing instruction in a memory location having a storage width in bits equal to the length in bits of the plurality of processing instructions.

18. The system for embedding information in program code as recited in claim 17 further including a look up table for storing said plurality of bit patterns in accordance with said plurality of index values.

* * * * *